United States Patent [19]
Martens

[11] Patent Number: 5,946,895
[45] Date of Patent: Sep. 7, 1999

[54] ADAPTER FOR MOWING BLADE WITH STAR

[75] Inventor: Daniel J. Martens, Brooklyn, Ohio

[73] Assignee: MTD Products Inc, Cleveland, Ohio

[21] Appl. No.: 08/982,096

[22] Filed: Dec. 1, 1997

Related U.S. Application Data

[63] Continuation-in-part of application No. 08/755,627, Nov. 25, 1996, Pat. No. 5,724,796.

[51] Int. Cl.$^6$ ..................................................... A01D 34/63
[52] U.S. Cl. ......................... 56/17.5; 56/295; 56/DIG. 20
[58] Field of Search ............................ 56/17.5, 255, 295, 56/DIG. 17, DIG. 20

[56] References Cited

U.S. PATENT DOCUMENTS

| | | | |
|---|---|---|---|
| 3,564,824 | 2/1971 | Tygh, Jr. ..................................... | 56/295 |
| 4,936,884 | 6/1990 | Campbell ............................... | 56/295 X |
| 5,454,216 | 10/1995 | Myszka .................................. | 56/255 X |
| 5,502,958 | 4/1996 | Plamper ..................................... | 56/17.5 |

*Primary Examiner*—H. Shackelford
*Attorney, Agent, or Firm*—Emerson & Associates; Roger D. Emerson; John M. Skeriotis

[57] ABSTRACT

A blade adapter for attaching a mower blade to a blade drive shaft of a lawn mower is disclosed. The blade adapter includes first and second extensions that extend beneath the bottom surface of the blade adapter and correspond with holes located along a longitudinal axis of the mowing blade equadistance from the center hole of the mowing blade. The first and second extensions act to pass torque between the blade adapter and the mowing blade, thereby reducing stresses on the teeth and slots of the central section of the blade adapter and mowing blade. A method for installing a mowing blade onto the disclosed blade adapter is also disclosed which includes the step of aligning the first and second holes of the mowing blade with the first and second extensions of the blade adapter and aligning the central star hole of the mowing blade with the central star section of the blade adapter.

30 Claims, 3 Drawing Sheets

ADAPTER FOR MOWING BLADE WITH STAR

This application is a streamlined continuation-in-part of application Ser. No. 08/755,627, now U.S. Pat. No. 5,724,796, filed Nov. 25, 1996.

BACKGROUND OF THE INVENTION

1. Field of Invention

This invention pertains to the art of methods and apparatuses for installing mowing blades on a lawn mower, and more specifically to methods and apparatuses for providing a new and approved blade adapter to fit between the mowing blade drive shaft and the mowing blade, particularly a mowing blade with a star configuration in the center hole.

2. Description of the Related Art

In the past, blade adapters were used as an interface between mowing blades and the mowing blade drive shafts of lawn mowers. The blade adapters were physically connected to the mowing blade drive shaft, and the mowing blade was then secured to the blade adapter. The blade adapter allowed mowing blades that were not specifically configured for mowing blade drive shafts to be installed in lawn mowers by acting as an interface between the blade and the drive shaft.

One type of blade adapter is illustrated in U.S. Pat. No. 5,502,958 to Plamper. The blade adapter shown is used to secure a mowing blade with star to the mowing blade drive shaft. The star configuration of the mowing blade was an important improvement in mowing blades in that it allowed for increased passing of torque between the blade and shaft. However, improper installation of mowing blades with the star configuration has caused the star configuration of the mowing blade adapter to weaken under the rotational torque.

Applicant recognized a need to further secure and aid in the proper installation of the mowing blade to the blade adapter. At the same time, applicant recognized a need to shorten the length of the moment arms of the rotational torques on the mowing blade with regards to the blade adapter to further reduce damage to the mowing blade adapter.

The present invention contemplates a new and improved blade adapter which is simple in design, effective in use, and overcomes the foregoing difficulties and others while providing better and more advantageous overall results.

SUMMARY OF THE INVENTION

In accordance with the present invention, a new and improved blade adapter is provided which aids in the proper installation of a new mowing blade to the blade adapter and the lawn mower while at the same time reducing some of the torque related stresses on the star section of the mowing blade and mowing blade adapter.

According to the present invention, a related adapter for attaching a mower blade to a blade drive shaft of a lawn mower is disclosed. The blade drive shaft has a cross sectional shape, a diameter, and a securing apparatus for fixedly securing the mower blade to the blade adapter and the blade drive shaft. The mower blade has a longitudinal axis, first and second holes and a star hole. The star hole has a central section and slots. Each of the slots has a center line. The center line of each of the slots is located angularly off the longitudinal axis of the mower blade. The first and second holes are located along the longitudinal axis equidistant from the central section of the star hole. The blade adapter includes a flange section, a mounting section extending from an upper surface of the flange section and having a circular hole extending therethrough. The circular hole has a shape and a diameter to match the cross sectional shape and diameter of the blade drive shaft. The blade adapter also includes a star section extending from a bottom surface of the flange section. The star section has teeth extending therefrom corresponding with the slots of the mower blade. The blade adapter also includes a first extension and a second extension that extend from the bottom surface of the flange section and correspond to first and second holes of the mower blade. The first and second extensions are receivable by the first and second holes. The blade adapter further includes a securing apparatus for fixedly securing the mower blade to the blade adapter.

According to another aspect of the present invention, a blade adapter for use with a lawn mower is disclosed. The lawn mower has a blade drive shaft and a mower blade. The blade drive shaft has a securing apparatus for fixedly securing the mower blade to the blade adapter and the blade drive shaft. The mower blade has a longitudinal axis, a central section, first and second holes equadistance from the center section along the longitudinal axis, and an attaching apparatus for attaching the mower blade to the blade adapter. The blade adapter includes a mounting apparatus for mounting the blade adapter to the blade drive shaft, a receiving apparatus for receiving the mowing blade, a flange section, and first and second extensions extending from the flange section which are receivable by the first and second holes of the mower blade.

According to another aspect of the present invention, a blade adapter for use with a lawn mower is disclosed. The lawn mower has a blade drive shaft and a mower blade. The blade drive shaft has a securing apparatus for fixedly securing the mower blade to the blade adapter and the blade drive shaft. The mower blade has a longitudinal axis, a central section, at least one hole a distance from the central section along the longitudinal axis, and an attaching apparatus for attaching the mower blade to the blade adapter. The blade adapter includes a mounting apparatus for mounting the blade adapter to the blade drive shaft, a receiving apparatus for receiving the mower blade, a flange section, and at least one extension extending from the flange section and being receivable by at least one hole of the mower blade.

According to another aspect of the present invention, a method of installing a mower blade on a blade drive shaft of a lawn mower is disclosed which includes the steps of mounting the blade adapter to the blade drive shaft, aligning the star hole of the mower blade with the star section of the blade adapter, aligning the first and second extensions with the first and second holes, inserting the star section into the star hole and the first and second extensions into the first and second holes, and fixedly securing the mower blade to the blade adapter with a securing apparatus.

One object of the present invention is to provide increased support for a mowing blade with star installed onto a blade adapter and blade drive shaft.

Another object of the present invention is to increase the ability of the blade adapter to pass torque from the blade adapter to the mowing blade.

Another object of the present invention is to reduce torque on the teeth of the star section of the blade adapter.

Another object of the present invention is to aid in the correct installation of a replacement mowing blade to a blade adapter and blade drive shaft of a lawn mower.

Still other benefits and advantages of the invention will become apparent to those skilled in the art to which it pertains upon a reading and understanding of the following detailed specification

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
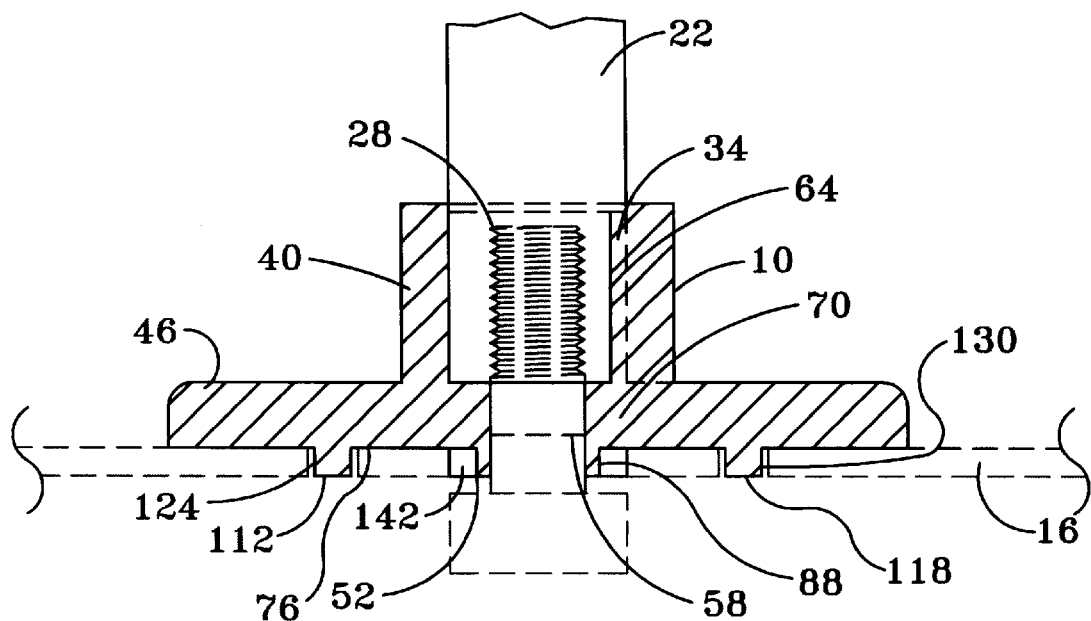
FIG. 1 is a cross sectional view of a blade adapter according to the present invention, a blade drive shaft, and a mowing blade.
Figure 2:
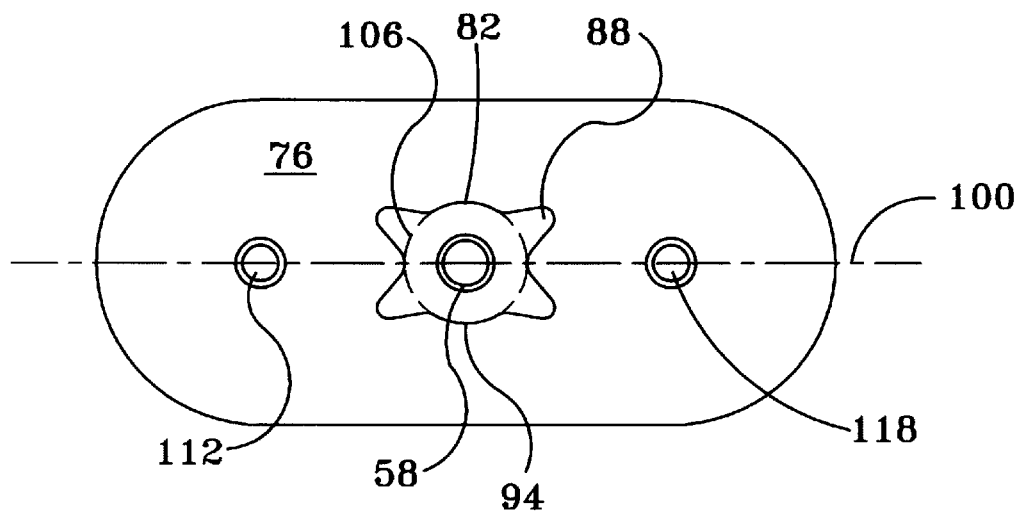
FIG. 2 is a bottom view of the mowing blade adapter of FIG. 1.
Figure 5:
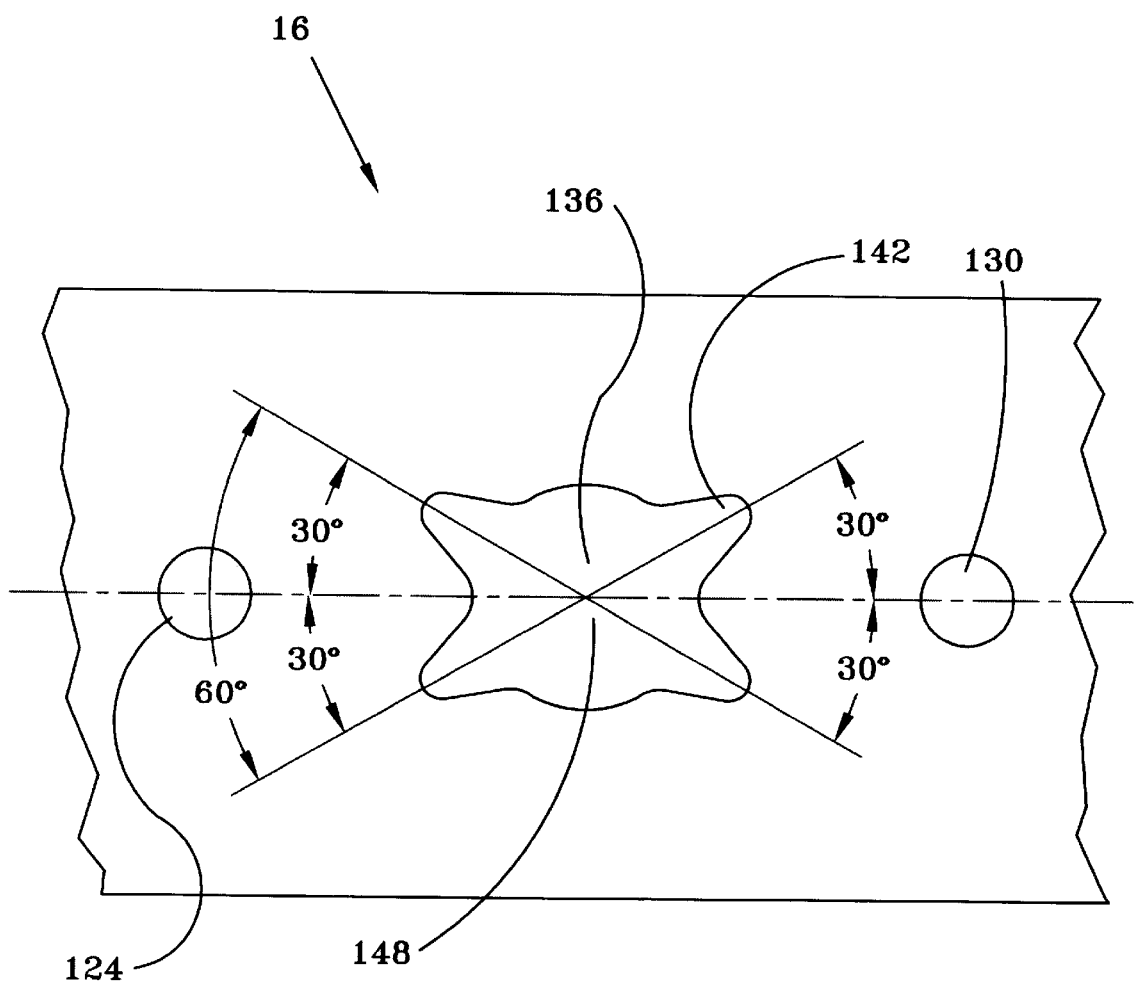
FIG. 5 shows a top view of a mowing blade.

Referring now to the drawings wherein the showings are for purposes of illustrating a preferred embodiment of the invention only and not for purposes of limiting the same, FIG. 1 shows a cross-sectional view and FIG. 2 shows a bottom view of a blade adapter 10 used to connect a mowing blade 16 (shown in FIG. 5) to the blade drive shaft 22 of a rotary lawn mower (not shown).

The mowing blade drive shaft 22 is a round shaft that is supported by a bearing assembly (not shown) to a mower deck (also not shown). This mowing blade drive shaft 22, which may be integral with the engine shaft, or which may exist singularly or in spaced multiples, is driven by an engine, normally through some sort of clutch/brake assembly. When the mowing blade drive shaft 22 is being rotated by the engine or engine shaft, the torque is passing in one direction from the blade drive shaft 22 to the mowing blade 16. When the blade drive shaft 22 is braked or otherwise being slowed relative to the mowing blade 16, the torque passes in the opposite direction between the mowing blade 16 and the blade drive shaft 22. The torque is thus passed hi-directionally between the blade drive shaft 22 and mowing blade 16. The particular blade drive shaft 22 disclosed has a threaded hole 28 and a generally rectangular key way 34 formed at its lower end. These are used to interconnect the blade drive shaft 22 to the blade adapter 10. Preferably a securing means such as a bolt or screw is used to connect the blade adapter 10 to the blade drive shaft 22. Other means could also be used.

The blade adapter 10 physically interconnects the blade drive shaft 22 to the mowing blade 16 in order to pass bi-directional torque therebetween. In particular blade adapter 10 disclosed is designed for use with the blade drive shaft 22 having the threaded hole 28 and the rectangular key way 34 previously described. This blade adapter 10 includes a mounting section 40, a flange section 46, and a star section 52. The blade adapter 10 is preferably constructed of powdered metal. The blade adapter 10 may also be integral with the blade drive shaft 22.

The mounting section 40 includes a circular hole 58 extending therethrough. The cross sectional shape and diameter of this hole 58 is selected to match the ross sectional shape and diameter of the blade drive shaft 22 to be utilized by such lade adapter 10. The particular hole 58 disclosed includes a rectangular key 64 matching generally the shape of the key way 34 on the blade drive shaft 22 extending therein. The depth of the hole 58 is selected so as to solidly interconnect the blade adapter 10 to the blade drive shaft 22. This is particularly important to any of the wobbling due to the high forces which are generated between the blade drive shaft 22 and the mowing blade 16. The thickness of the wall of the mounting section 40 is designed with similar thoughts in mind. In the particular embodiment disclosed, the diameter of the hole 58 is approximately 0.875 inches in diameter with the key way 34 extending approximately 0.075 inches therein, such key way 34 having a width of approximately 0.1837 inches. The height of the mounting section 40 is approximately 0.80 inches with a wall thickness of 0.250 inches.

The flange section 46 serves to mechanically interconnect the mounting section 40 with the star section 52 as well as providing an increased angular support for the mowing blade 16. The central section 70 of the flange section 46 between the star section 52 and the walls of the mounting section 40 passes the torque bi-directionally between.

The remainder of the flange section 46 serves as a physical support for the mowing blade 16. Theoretically, this flange section 46 should he as large as possible with the physical dimensions of the available matching section of the mowing blade 16.

Such a size would, however, cause a parasitic power loss due to the cross sectional height of the flange section 46 as well as potentially comprising the air flows under the mowing deck caused by the mowing blade 16. Physical dimensions of the flange section 46 are therefore chosen in an optimization procedure to provide the necessary angular support for the mowing blade 16 while at the same time not unduly comprising the below deck air flow. In the particular embodiment disclosed, the flange section 46 is a generally rectangular member having a flat bottom surface 76. This flat bottom surface 76 is selected with a length and width to match the angular deflection requirements of the mowing blade 16 being utilized with the blade adapter 10. As the particular mowing blade 16 is mulching blade, the matching flat surface on the mowing blade 16 is of a certain distance between the downward extending rounded edge section. This width is slightly less than if the mowing blade 16 is a conventional discharge blade. The flat bottom surface 76 of the blade adapter 10 has a width selected to match the flat surface width of the mowing blade 16, thus optimizing the support for torsional bending of the mowing blade 16 (i.e., any further increase in width would not serve the bottom surface 76 under anticipated forces). In the particular embodiment disclosed, the height is approximately 0.38 inches. Note that With this height, the bottom of the secure hole 58 and the mounting section 40 is located slightly above the top surface of the flange section 46. This slightly strengthens the section by providing a slight angle therebetween, thus increasing the lateral sheer strength between the mounting section 40 and the flange section 46.

Figure 4:
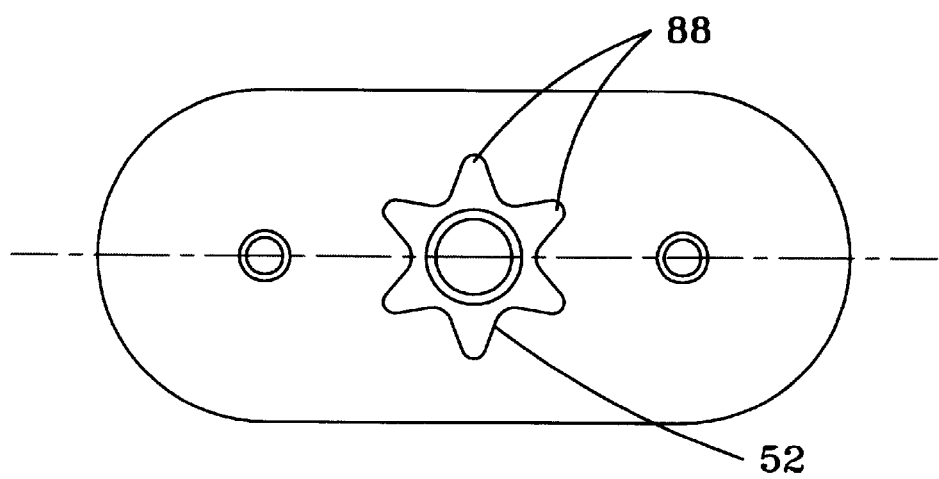
FIG. 4 is an alternate embodiment whereby the star section of the blade adapter has six teeth.

The star section 52 of the blade adapter 10 is the main mechanical interconnect between the blade adapter 10 and the mowing blade 16. Ideally, this mechanical interconnect should have a solid rotational contact with the mowing blade 16 so as to optimize the torque transfer between the blade drive shaft 22 and the mowing blade 16. The star section 52 should therefore physically prevent the mowing blade 16 from rotating with respect to the blade drive shaft 22 while at the same time maximizing the cross sectional surface area of contact between the stat section 52 and mowing blade 16, thus insuring the efficient passage to torque. In addition, preferably the star section 52 should be designed so as to correctly align the mowing blade 16 with the blade adapter 10 under non-skilled attachment. This would allow for the correct positioning of the two components when serviced in the field, thus allowing the manufacturer's design to be continued to be implemented after such servicing. In the particular embodiment disclosed there are two equally correct positions for the mowing blade 16 in respect to the blade adapter 10, each position 180° opposite the other. In this particular preferred embodiment, the star section 52 has a generally circular profile section 82 with four protruding asymmetrical teeth 88. These teeth 88 are generally in symmetrical alignment with the longitudinal length of the later described mowing blade 16, thus optimizing the amount of material between such teeth 88 and the lateral edges of the mowing blade 16. In another preferred embodiment, the star section 52 may have six teeth 88 as shown in FIG. 4.

Central section 82 of the star section 52 primarily provides an axis hole for the later described attaching means, such as a bolt, that holds the mowing blade 16 on to the blade adapter 10. Central section 82 also provides for an increased area of contact between the star section 52 and the mowing blade 16 by displacing same from the rotational axis thereof. This area of contact increases the surface area of contact between the star section 52 and the mowing blade 16, thus increasing the strength of this critical torque passing section. In the particular embodiment disclosed this center section 82 had a slight outward arc. The middle point 94 of the sides of the star section 52 of this circular area serves to more precisely locate the mowing blade 16 in respect to the star section 52 than an alternate surface would, such as a straight edge. The reason for this is that the tolerances for clearances for both the central section 82 and later described teeth 88 can be less if rotary tolerances can be factor out as they can with the preferred shape This shape also insures that the later described teeth 88 are the primary units to pass the torque between the star section 52 and mowing blade 16.

The teeth 88 of the star section 52 serve to pass the primary torque between the blade adapter 10 and the mowing blade 16. The teeth 88 in addition aid in assuring alignment of the mowing blade 16 in respect to the blade adapter 10. In the particular embodiment disclosed, the teeth 88 are four in number, each angularly displaced symmetrically by the longitudinal axis 100 of the mowing blade 16. The orientation of the teeth 88 in this manner increases the critical width of contact along which has to be passed per unit area. The teeth 88 are angled with an angle approximately 30° off the longitudinal axis of the mowing blade 16 and an angle of approximately 60° between their center lines, each tooth 88 having a side profile angle of 40°. As width does not generally comprise airflow, this width can be preferrably maximized the with of the mowing blade 16 is selected in an optimization of the need to torsional support. The length of the bottom surface of the blade adapter 10 is designed to minimize an up and down flexing along the length of the mowing blade 16. Ideally, to accomplish this purpose, the length would match the length of the flat surface of the mowing blade 16, thus optimizing this function. However, such a length would, as previously discussed, potentially comprise the air flow under the mower deck as well as producing parasitic power losses due to an increase cross sectional area. The length is chosen in an optimization procedure to provide a sufficient longitudinal angular flexing support for the mowing blade 16 while at the same time minimizing parasitic type loses. In the embodiment shown, this means the length of the blade adapter 10 is approximately one sixth of the length of the mowing blade 16.

In the preferred embodiment disclosed, the support section of the blade adapter 10 has a width of 1.38 inches and a length of 3.30 inches, with the ends rounded with approximately a 0.69 inch radius. This radiusing of the ends is designed to eliminate a point to point contact which could otherwise occur at the other ends of the blade adapter 10 on any flexing and/or torsional movement of the mowing blade 16. Rounded corners are also easier to construct in the powder metal construction utilized for this particular blade adapter 10. The height of the flange section 46 is selected in order to retain the bottom surface 76 flat in contradiction to the torsional angular forces produced by the mowing blade 16. Ideally, the height is selected so as to produce to flexing of maximum amount of metal on the width of the mowing blade 16 to pass torque to/from the mowing blade 16 given the usage of four teeth 88. In addition, the orientation of the teeth 88 in this manner increases the critical width of contact teeth 88 along the length of the mowing blade 16, thus lower the amount of force which has to be passed per unit area. In the particular embodiment disclosed, the central section 82 is approximately 0.685 inches in a circular diameter 106. The end of each of the teeth 88 extends approximately 0.157 inches off the central section 82, with a total length across opposing teeth 88 being approximately 1 inch. Due to the circular profile of the center section 82, these teeth 88 pass the torque between the star section 52 and the mowing blade 16. In that the teeth 88 are displaced by a maximum distance from the coextensive rotational axis, this maximizes torque transfer.

Further, extending from the bottom surface 76 of the flange section 46 of the blade adapter 10 are first and second extensions 112, 118. First and second extensions 112, 118 correspond to first and second holes 124, 130 located along the longitudinal axis 100 of the mowing blade 16 equidistant from the star hole 136 in the center. When the mowing blade 16 is installed onto the blade adapter 10, the star hole 136 fits over top of the star section 52 of the blade adapter 10, and the first and second extensions 112, 118 are placed into the first and second holes 124, 130 respectively. The first and Second extensions 112, 118 further act to pass the primary torque between the blade adapter 10 and the mowing blade 16. Further, the first and second extensions 112, 118 provide added support if the teeth 88 of the star section 52 of the blade adapter 10 do not fit snuggly within the slots 142 of the star hole 136 of the mowing blade 16.

Figure 3:
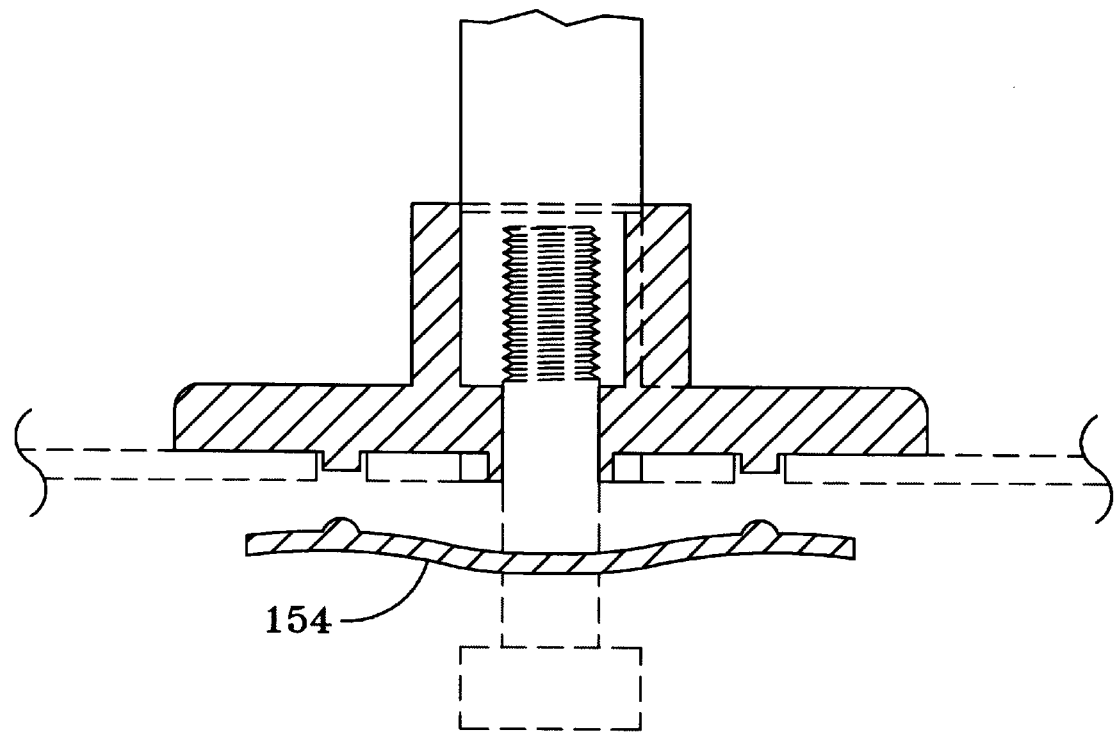
FIG. 3 is an alternate embodiment of the invention as shown in FIG. 1 which includes a blade bell support.

The first and second extensions 112, 118 are preferably round, with a diameter of 0.25 inch. In a preferred embodiment of the present invention, the first and second extensions 112, 118 extend 0.10 inches from the bottom surface 76 of the blade adapter 10. This prevents the first and second extensions 112, 118 from interfering with a blade bell support 154, as shown in FIG. 3, if it is used with the blade adapter 10.

The star hole 136 of the mowing blade 16 preferably has a shaped generally tracking the shape of the star section 52 of the blade adapter 10. This star hole 136 includes a central section 148 and slots 142. The central section 148 of the star hole 136 matches generally the shape of the central section 82 of the star section 52, the major difference being that the central section 148 has a slightly larger diameter so as to supply the clearance to snuggly fit over the star section 52. Likewise, the shape of the slots 142 generally match the shape of the teeth 88, again with some size difference so as to provide for a mounting clearance. By utilizing the first and second extensions 112, 118 on the blade adapter 10, slight variances in the preferred size of the star hole 136 may be overcome while preventing damage to the mowing blade 16. The star hole 136 may have any number of slots 142, while the preferred embodiments have four or six slots 142. The embodiment shown in the figures is of a star hole 136 with four slots 142. However, the present invention may be utilized with a star hole blade that includes any number of slots 142. The star section 52 of the blade adapter 10 should have a number of teeth 88 that corresponds with the number of slots 142 in the mowing blade 16.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of installing a mower blade on a blade drive shaft of a lawn mower, said blade drive shaft having securing means for fixedly securing said mower blade to a blade adapter and said blade drive shaft, said mower blade having a longitudinal axis, first and second holes, and a star hole, said star hole having a central section and slots, said first and second holes being located along said longitudinal axis equidistant from said central section of said star hole, said blade adapter having a flange section, mounting means for mounting said blade adapter to said blade drive shaft, a star section extending from a bottom surface of said flange section, said star section having teeth extending therefrom corresponding with said slots of said mower blade, and first and second extensions extending from said bottom surface of said flange section and corresponding to said first and second holes of said mower blade, said first and second extensions being receivable by said first and second holes, said method comprising the steps of:

mounting said blade adapter to said blade drive shaft;

aligning said star hole of said mower blade with said star section of said blade adapter;

aligning said first and second extensions with said first and second holes, said first and second extensions being used to reduce torque on said star section;

inserting said star section into said star hole and said first and second extensions into said first and second holes; and, fixedly securing said mower blade to said blade adapter with said securing means.

2. A blade adapter comprising:
a) a flange section;
b) at least two extensions;
c) a star section having a longitudinal axis and a threaded hole for use with a drive shaft having a corresponding star shape;
d) at least two teeth, all of the teeth directly interconnecting the blade to the blade adapter passing substantially equal torque therebetween respectively, the teeth extending outward off of the threaded hole, the teeth having center lines:
e) the center lines of the teeth being located at an angle of greater than 45° in reference to the longitudinal axis of the blade adapter with no active tooth having an angle of less than 45°; and,
f) the extensions protruding downwardly from the flanges.

3. The blade adapter of claim 2, wherein the star section is characterized in that the threaded hole is circular.

4. The blade adapter of claim 2, wherein the star section has four teeth.

5. The blade adapter of claim 4, wherein the star section is characterized in that the four teeth are arranged symmetrically in pairs on opposing sides of the longitudinal axis of the blade adapter.

6. The blade adapter of claim 5, wherein the star section is characterized in that the center lines of the four teeth each form an angle of substantially 30° in respect to the longitudinal axis of the blade adapter.

7. The blade adapter of claim 6, wherein the star section is characterized in that the threaded hole has an arcuate shape about the reference line between opposing pairs of teeth.

8. A blade adapter comprising:
a) a flange section;
b) at least two extensions;
c) a star section having a longitudinal axis and a threaded hole for use with a drive shaft having a corresponding star shape;
d) at least two teeth, the teeth extending outward off of the threaded hole;
e) the teeth having center lines; and,
f) the center lines of the teeth being located at an angle of greater than 45° to a reference line run through the center of the threaded hole perpendicular to the longitudinal axis of the blade adapter, and the teeth having straight side profiles, and the side profiles being angled at an angle of 15–25° in respect to the center line of die respective tooth.

9. A blade adapter comprising:
a) a flange section;
b) at least two extensions;
c) a star section having a longitudinal axis and a threaded hole for use with a drive shaft having a corresponding star shape;
d) four teeth, the teeth directly interconnecting the blade to the blade adapter passing substantially equal torque therebetween respectively;
e) the teeth extending outward off of the threaded hole; and,
f) the teeth having center lines, and the center lines of two adjacent of the teeth being located at an angle of greater than 90° in respect to each other.

10. The blade adapter of claim 9, wherein the teeth have straight side profiles, and the side profiles being angled at an angle of 15–25° in respect to the center line of the respective tooth.

11. A blade adapter comprising:
a) a flange section;
b) at least two extensions;
c) a star section having a longitudinal axis and a threaded hole for use with a drive shaft having a corresponding star shape;
d) a generally circular profile threaded hole center section and four teeth;
e) the teeth directly interconnecting the blade to the blade adapter passing substantially equal torque therebetween respectively;
f) the teeth extending outward off of the threaded hole;
g) the teeth being spaced from the nearest edge of the blade adapter by a certain first distance; and,
h) the generally circular profile threaded hole center section being spaced from the nearest edge of the blade adapter by a second distance, and the second distance being less than the certain first distance.

12. The blade adapter of claim 11, wherein the star section is characterized in that the teeth have center lines and the center lines of the teeth being located at an angle of greater than 45° to a reference line run through the center of the threaded hole perpendicular to the longitudinal axis of the blade adapter.

13. The blade adapter of claim 12, wherein the star section is characterized in that the teeth have outer ends and the intersection with the straight edge occurring substantially at the outer ends of the another tooth.

14. The blade adapter of claim 11, wherein
 a) the teeth have center lines;
 b) the center lines of the teeth being located at an angle of greater than 45° to a reference line run through the center of the threaded hole perpendicular to the longitudinal axis of the blade adapter;
 c) the teeth have straight side profiles; and,
 d) the side profiles being angled at an angle of 15–25° in respect to the center line of the respective tooth.

15. A blade adapter comprising:
 a) a flange section;
 b) at least two extensions;
 c) a star section having a longitudinal axis and a threaded hole for use with a drive shaft having a corresponding star shape;
 d) four teeth;
 e) the teeth directly interconnecting the shaft to the blade passing substantially equal torque therebetween respectively;
 f) the teeth extending outward off of the threaded hole symmetrically in first and second pairs on opposing sides of the threaded hole;
 g) the teeth-having center lines respectively;
 h) the center lines of the first pair of teeth being angled in respect to each other at substantially 60°, and the center lines of the second pair of teeth being angled in respect to each other at substantially 60°; and,
 i) the center lines of the four teeth each form an angle of substantially 30° in respect to the longitudinal axis of the blade adapter.

16. The blade adapter of claim 15, wherein the teeth have straight side profiles, and the side profiles being angled at an angle of 15–25° in respect to the center line of the respective tooth.

17. The blade adapter of claim 15, wherein all of the center lines of the teeth being located at an angle of substantially 60° to a reference line run through the center of the threaded hole perpendicular to the longitudinal axis of the blade adapter.

18. A blade adapter comprising:
 a) a flange section;
 b) at least two extensions;
 c) a star section having a longitudinal axis and a threaded hole for use with a drive shaft having a corresponding star shape;
 d) four teeth;
 e) the teeth extending outward off of the threaded hole symmetrically in first and second pairs on opposing sides of the threaded hole;
 f) the teeth having center lines respectively;
 g) the center lines of the first pair of teeth being angled in respect to each other at substantially 60°, the center lines of the second pair of teeth being angled in respect to each other at substantially 60°;
 h) the center lines of the four teeth each forming an angle of substantially 30° in respect to the longitudinal axis of the blade adapter, and all of the center lines of the teeth being located at an angle of substantially 60° to a reference line run through the center of the threaded hole perpendicular to the longitudinal axis of the blade adapter; and,
 i) the teeth have straight side profiles, and the side profiles being angled at an angle of 15–25° in respect to the center line of the respective tooth.

19. A blade adapter comprising:
 a) a flange section;
 b) at least two extensions;
 c) a star section having a longitudinal axis and a threaded hole for use with a drive shaft having a corresponding star shape;
 d) a series of teeth;
 e) the teeth each having a center line and a straight edge;
 f) the straight edges each being angled in respect to its center line respectively at an angle of substantially 20°; and,
 g) the center line of at least two adjacent teeth being angled in respect to each other at substantially 120°.

20. The blade adapter of claim 19, wherein the star section is characterized in that the teeth each have a further straight edge and the further straight edge each being angled in respect to its the center line respectively at an angle of substantially 20°.

21. The blade adapter of claim 19, wherein the star section is characterized in that a line extending centrally from the angled straight edges respectively intersects at the edge of another tooth.

22. The blade adapter of claim 20, wherein the star section is characterized in that a line extending centrally from the further straight edges respectively intersects the further straight edge of another tooth.

23. The blade adapter of claim 22, wherein the star section is characterized in that the teeth have outer ends and the intersection with the further straight edge occurring substantially at the outer ends of the another tooth.

24. A blade adapter comprising:
 a) a flange section;
 b) at least two extensions;
 c) a star section having a longitudinal axis and a threaded hole for use with a drive shaft having a corresponding star shape;
 d) an end of a spindle;
 e) the hole in the blade adapter having a series of outwardly extending teeth;
 f) the outwardly extending teeth each having a center line and a straight edge and a further straight edge;
 g) the straight edges each being angled in respect to the center line respectfully at an angle of substantially 20°;
 h) the further straight edges each being angled in respect to its center line respectively at an angle of substantially 20°; and,
 i) the teeth being formed in opposing pairs, the center lines of one pair of the pairs of teeth being angled in respect to the other pair of the pairs of teeth by 120° respectively.

25. A blade adapter comprising:
 a) a flange section;
 b) at least two extensions;
 c) a star section having a longitudinal axis and a threaded hole for use with a drive shaft having a corresponding star shape;

d) four teeth;

e) the four teeth extending outward off of the threaded hole;

f) the four teeth having center lines;

g) the four teeth being arranged in pairs, each pair of the four teeth being opposed;

h) the center lines of the pairs of opposed teeth of the four teeth being aligned with each other;

i) the four teeth having at least one straight edge side profile, the straight edge side profile being angled at an angle of 15–25° in respect to the center line of the respective tooth; and, j) the side profiles directly interconnecting the blade to the blade adapter passing torque therebetween respectively.

26. The blade adapter of claim 25, wherein the star section is characterized in that the side profiles are on opposite sides of the center lines respectively.

27. The blade adapter of claim 25, wherein the star section includes each of the pairs of teeth having center lines, the center lines of each pair being aligned with each other, each tooth of each pair having at least one straight edge side profile, and each the straight edge side profile being angled at an angle of 15–25° in respect to the center line of the respective tooth.

28. The blade adapter of claim 25, wherein the star section is characterized by the addition of the teeth having trailing edges, and the trailing edges being angled in respect to the center lines at an angle of substantially 15–25°.

29. The blade adapter of claim 25, wherein the star section is characterized in that at least the two straight edge profiles are parallel.

30. A blade adapter comprising:

a) a flange section;

b) a star section having a longitudinal axis and a threaded hole for use with a drive shaft having a corresponding star shape;

c) at least two teeth, all of the teeth directly interconnecting the blade to the blade adapter passing substantially equal torque therebetween respectively, the teeth extending outward off of the threaded hole, the teeth having center lines; and, d) the center lines of the teeth being located at an angle of greater than 45° to a reference line run through the center of the threaded hole perpendicular to the longitudinal axis of the blade adapter with no active tooth having an angle of less than 45°.

* * * * *